United States Patent [19]

Buckwalter

[11] 3,881,942

[45] May 6, 1975

[54] FAST DRYING, SOLVENT-FREE PRINTING INK

[75] Inventor: Geoffrey R. Buckwalter, Cincinnati, Ohio

[73] Assignee: Borden, Inc., Columbus, Ohio

[22] Filed: Oct. 1, 1973

[21] Appl. No.: 402,418

Related U.S. Application Data

[62] Division of Ser. No. 211,754, Dec. 23, 1971, Pat. No. 3,804,640.

[52] U.S. Cl. .................. 106/22; 106/23; 106/29; 106/30; 106/220; 106/241; 106/253; 106/264; 204/159.15; 204/159.19; 204/159.24; 260/22 R; 260/23 H; 260/37 NP; 260/42.21

[51] Int. Cl. ............................... C09d 11/02

[58] Field of Search ................ 106/20–26, 106/27, 28, 29, 30, 31, 32, 231, 220, 241, 253, 264; 204/159.24, 159.15, 159.19; 260/18, 37 R, 22 R, 23 H, 37 NP, 42.21

[56] References Cited
UNITED STATES PATENTS

| | | | |
|---|---|---|---|
| 2,135,976 | 7/1936 | Koenig et al. | 106/28 X |
| 2,600,202 | 6/1952 | Caird | 204/159.24 |
| 2,762,712 | 9/1956 | Block et al. | 106/28 |
| 3,047,422 | 7/1962 | Sites et al. | 106/28 X |
| 3,050,413 | 8/1962 | Sites et al. | 106/28 X |
| 3,051,591 | 8/1962 | Sites et al. | 106/28 X |
| 3,535,292 | 10/1970 | Castrantas et al. | 260/78.5 |
| 3,547,580 | 12/1970 | Cohen | 106/252 |
| 3,668,098 | 6/1972 | Daimer et al. | 106/252 X |
| 3,753,715 | 8/1973 | Klupfel | 96/35.1 |

FOREIGN PATENTS OR APPLICATIONS

| | | | |
|---|---|---|---|
| 1,026,878 | 4/1966 | United Kingdom | 106/252 |

*Primary Examiner*—Lorenzo B. Hayes
*Attorney, Agent, or Firm*—George A. Kap; George P. Maskas

[57] ABSTRACT

A solvent-free printing ink vehicle that dries rapidly under the influence of heat alone or heat in conjunction with ultraviolet light, and printing ink compositions containing said vehicle. The printing ink vehicle comprises an ester of a saturated or unsaturated aliphatic alcohol and a $C_{12}$ to $C_{20}$ unsaturated fatty acid, a film forming resin, and a metal salt of peroxydiphosphoric acid. Printing ink compositions employing these vehicles can be dried in less than 1 second.

3 Claims, No Drawings

3,881,942

FAST DRYING, SOLVENT-FREE PRINTING INK

This is a division of application Ser. No. 211,754, filed Dec. 23, 1971, now U.S. Pat. No. 3,804,640.

BACKGROUND OF THE INVENTION

High speed printing presses require the use of fast drying inks. A commonly used type of fast drying printing ink is the so-called solvent ink containing a solvent which is essentially non-volatile at ordinary temperatures but which is volatilizable at a substrate surface temperature of the order of about 150°C–180°C. The use of such inks requires not only the installation on the press of heaters to heat the paper, but also the installation of exhaust fans and ducts to remove the vapors and fumes coming from the printed paper so that, while the inks have been successful in large scale printing operations, there is still the desire to provide a fast drying printing ink which can be used without the necessity for the installation of large amounts of equipment in connection with the printing press. Another disadvantage of solvent inks is the fact that vapors and fumes removed from the printed paper are a source of air pollution.

Another approach to fast drying inks is the use of solvent-free ink vehicles comprising polyunsaturated drying oils and other binders, as well as film forming resins, in conjunction with a photosensitizer which will dry rapidly under the influence of actinic radiation such as ultraviolet light. While inks employing this type of vehicle do not evolve appreciable quantities of vapors and fumes on drying, they do have a number of disadvantages. For example, although such inks are classified as fast drying, drying times only of the order of several seconds are achieved and such drying times are long enough to make their use on high speed printing presses marginal. In addition, the film forming resin and other additives in the inks may cause the viscosity to increase to the point where the ink is not usable.

SUMMARY OF THE INVENTION

It is therefore an object of this invention to provide a solvent-free printing ink vehicle.

It is another object of this invention to provide a solvent-free printing ink vehicle that is very fast drying.

It is still another object of this invention to provide a fast drying, solvent-free printing ink vehicle having a high level of fluidity.

Yet another object of this invention is to provide a fast drying, solvent-free printing ink having a high level of fluidity.

Other objects and advantages of this invention will be apparent to those skilled in the art from the following description of this invention.

The foregoing objects are achieved in accordance with the practice of this invention. Broadly, this invention consists of a fast drying, solvent-free printing ink vehicle comprising:

a. an ester of an aliphatic alcohol and a $C_{12}$ to $C_{20}$ unsaturated fatty acid;
b. a film forming resin; and
c. a metal salt of peroxydiphosphoric acid; and a fast drying, solvent-free printing ink comprising a major proportion of the foregoing printing ink vehicle and a minor proportion of a pigment.

Thus, by the practice of this invention there are provided a fast drying, solvent-free printing ink vehicle having a high level of fluidity and a printing ink based on said vehicle. The printing inks of this invention are extremely fast drying, making them particularly attractive for use on high speed printing presses. In addition, these printing inks have a high level of fluidity, even with high loadings of film forming resins. Furhermore, the absence of a solvent makes possible the elimination of exhaust fans and ducts from printing presses using the inks as well as elimination of air pollution resulting from solvent vapor and fumes.

DETAILED DESCRIPTION

The printing ink vehicles of this invention and printing inks comprising a major proportion of said vehicle and a minor proportion of a pigment are extremely fast drying, drying times of less than 1 second being achieved. In addition, the vehicles and inks are highly fluid and are free from solvent with all its disadvantages.

By printing ink vehicle is meant the fluid portion of a printing ink excluding the pigment. the vehicle may contain dissolved film forming resins, catalysts, photosensitizers and polyunsaturated crosslinking agents such as drying oils.

The printing ink vehicle of this invention is comprised of three principal components, namely, a film forming resin, an aliphatic ester of a $C_{12}$ to $C_{20}$ unsaturated fatty acid, and a catalyst which is a metal salt of peroxydiphosphoric acid. Conventional additives, such as wax slip agents and driers, may also be present if desired. Film forming resins for use in varnish and printing ink vehicles are well known. The choice of film forming resin for use in the practice of this invention is not critical and will be readily determined by one skilled in the art to suit the particular requirements of the vehicle or printing ink. Examples of suitable film forming resins are rosin esters; phenolic resins; chlorinated rubber; ethyl cellulose; polyvinyl chloride, either soluble or a plastisol (dispersed) type; polyester resins; and acrylic resins.

The ester of an aliphatic alcohol and a $C_{12}$ to $C_{20}$ unsaturated fatty acid is a critical component of the printing ink vehicle of my invention. The aliphatic alcohol which is condensed with the $C_{12}$ to $C_{20}$ unsaturated fatty acid to form the ester may be either saturated or unsaturated and may contain from 1 to about 20 carbons. Examples of suitable alphatic alcohols that may be condensed with the $C_{12}$ to $C_{20}$ unsaturated fatty acid to form the ester are methanol; ethanol; n-propanol; isopropanol; n-butanol; isoamyl alcohol; allyl alcohol; crotyl alcohol; 2-octen-1-ol; oleyl alcohol; 1-eicosanol; n-pentadecanol; and 2,4-decadien-1-ol. Examples of suitable $C_{12}$ to $C_{20}$ unsaturated fatty acids that may be condensed with an aliphatic alcohol to form the ester are oleic acid; elaidic acid; 9,13-octadecadienoic acid; 2-eicosenoic acid; 2-dodecenoic acid; 2,4-pentadecadienoic acid; 2-hexadecenoic acid; eleostearic acids; licanic and related acids; linoleic and linolenic acids; mixtures of diene, triene and more highly unsaturated $C_{18}$ acids; erucie acid; ricinoleic acid; clupanodonic acid; rosin acids; and mixtures thereof. The ester of an aliphatic alcohol and a $C_{12}$ to $C_{20}$ unsaturated p fatty acid of this invention is characterized by the ability to dissolve film forming resin in large amounts while retaining a high level of fluidity. This is especially advantageous in solvent-free inks where incorporation of film forming resin in the vehicle composition often leads to unacceptably high viscosity.

The choice of catalyst in the instant ink vehicle composition is critical and is restricted to metal salts of peroxydiphosphoric acid. Preferred are water-insoluble metal salts of peroxydiphosphoric acid. The metal salts of peroxydiphosphoric acid are unique in that they do not body up in the ink vehicle composition to thereby render the vehicle or the ink too viscous for use. While any metal salt of peroxydiphosphoric acid may be used, alkali metal and alkaline earth metal salts are preferred. The alkaline earth metal salts, which are water-insoluble, are most preferred. Examples of suitable metal salts of peroxydiphosphoric acid are copper peroxydiphosphate, zinc peroxydiphosphate, tetrasodium peroxydiphosphate, tetrapotassium peroxydiphosphate, magnesium peroxydiphosphate, calcium peroxydiphosphate, strontium peroxydiphosphate, and barium peroxydiphosphate. As stated above, the water-insoluble alkaline earth metal salts, particularly barium peroxydiphosphate, are preferred.

The composition of the printing ink vehicle of this invention may vary over a broad range. Generally, however, the composition will comprise about 5 weight percent to about 80 weight percent, and preferably about 20 weight percent to about 60 weight percent, of the ester of an aliphatic alcohol and a $C_{12}$ to $C_{20}$ unsaturated fatty acid; about 5 weight percent to about 40 weight percent, and preferably about 10 weight percent to about 35 weight percent, of a film forming resin; and about 1 weight percent to about 10 weight percent, and preferably about 3 weight percent to about 6 weight percent, of a metal peroxydiphosphate.

The printing ink vehicle of this invention, and printing inks based on the vehicle, are rapidly dried by heating. Heat causes the metal peroxydiphosphate to undergo cleavage to form radicals which cause the ester of the unsaturated fatty acid to polymerize and thus dry. While the heating temperature is not especially critical, it will be understood by those skilled in the art that the higher the temperature, the faster the rate of polymerization, i.e., drying. It has been found that heating the substrate surface to temperatures in the range of from about 100°C to about 175°C are preferred.

If desired, the printing ink vehicle of this invention may also contain polyunsaturated materials and photosensitizers. When polyunsaturated materials and photosensitizers are present, the printing ink vehicle is capable of being dried to at least some extent by actinic radiation, e.g., ultraviolet light. Thus, when the printing ink vehicle of this invention contains a polyunsaturated material and a photosensitizer in addition to the ester, the film forming resin, and the metal peroxydiphosphate, the vehicle may be dried either by heat alone or heat in conjunction with actinic, e.g., ultraviolet, radiation. By employing two means for drying the vehicle, as well as inks based on the vehicle, even faster drying times may be achieved.

Examples of polyunsaturated materials that may be present in the printing vehicle are drying oils such as heat treated tung oil and boiled linseed oil, low pressure butadiene polymer, abietic acid esters, trimethylol propane triacrylate, and pentaerythritol tri- and tetra-acrylates. Examples of suitable photosensitizers are halogenated hydrocarbons, acyloins, organic titanates such as alkyl titanates, substituted and unsubstituted benzophenones, triethanolamine, morpholine, and anthraquinone. When polyunsaturated materials and photosensitizers are present in the printing ink vehicle, the total vehicle will contain about 5 weight percent to about 60 weight percent, and preferably about 10 weight percent to about 30 weight percent, of the polyunsaturated material and about 1 weight percent to about 10 weight percent, and preferably about 2 weight percent to about 6 weight percent, of the photosensitizer.

Printing ink compositions based on the printing ink vehicles of this invention may employ a wide variety of pigments. Examples of suitable pigments are carbon black, phthalocyanine blue, benzidine yellow, phloxine red, barium lithol, and lithol rubine. the amount of pigment in the printing ink composition will vary depending on the pigment and based on such factors as tinting strength and covering power of the pigment. Broadly, printing ink compositions will comprise a major proportion of printing ink vehicle and a minor proportion of pigment. However, printing inks of this invention would generally contain about 5 to 45 weight percent of pigment, and preferably about 5 to 35 weight percent of pigment.

Printing ink compositions of this invention wherein a pigment is incorporated in a printing ink vehicle comprising a film forming resin, an alkyl ester of a $C_{12}$ to $C_{20}$ unsaturated fatty acid, and a metal peroxydiphosphate may be used on printing presses equipped with heaters whereby the ink dries in less than one second. Printing ink compositions wherein the vehicle in addition contains a polyunsaturated material and a photosensitizer may be used on printing presses equipped with heaters, and preferably, equipped also with ultraviolet lamps whereby the ink dries in less than one second. Printing inks of this invention, when dried by heat alone or heat in conjunction with ultraviolet light, will dry in times of the order of about 0.5 to about 0.8 second.

The present invention is hereinafter further described with reference to particular examples thereof. It will be appreciated that these examples are presented for illustrative purposes and should not be construed as limitations on the invention as hereinabove described. In the examples, all quantities are in parts by weight.

EXAMPLE I

A printing ink having the following composition is prepared:

| | | |
|---|---|---|
| heat treated tung oil | 30.0 | parts |
| rosin ester | 22.0 | parts |
| polyethylene | 5.0 | parts |
| wax | 5.0 | parts |
| methyl eleostearates | 18.0 | parts |
| potassium peroxydiphosphate | 5.0 | parts |
| carbon black | 15.0 | parts |

When a paper web substrate printed with this ink is heated within the range of about 100°–175°C, the ink dries in less than 1 second.

EXAMPLE II

A printing ink having the same composition as that of Example I, except the 5.0 parts of potassium peroxydiphosphate are replaced by 5.0 parts of barium peroxydiphospahte, is prepared. When a substrate printed with this ink is heated within the temperature range of about 100°–175°C, the ink dries in less than 1 second.

EXAMPLE III

A printing ink having the same composition as that of Example II, except the 22.0 parts of rosin ester are replaced by 22.0 parts of the aluminum octotate gel of rosin ester, is prepared. When a substrate printed with this ink is heated at 100°–175°C, the ink dries in less than 1 second.

EXAMPLE IV

A printing ink having the same composition as that of Example III, except the 18.0 parts of methyl eleostearates are replaced by 18.0 parts of a mixture of methyl linoleate and methyl linolenate, is prepared. When a substrate printed with this ink is heated at a temperature within the range of about 100°–175°C, the ink dries in less than 1 second.

EXAMPLE V

A printing ink having the following composition is prepared:

| | | |
|---|---|---|
| heat treated tung oil | 30.0 | parts |
| pentaerythritol tetraacrylate | 10.0 | parts |
| aluminum octoate gel of rosin ester | 16.5 | parts |
| methyl eleostearates | 13.5 | parts |
| barium peroxydiphosphate | 4.0 | parts |
| methyl ester of rosin acids | 10.0 | parts |
| benzophenone | 3.0 | parts |
| morpholine | 3.0 | parts |
| phthalocyanine blue pigment | 10.0 | parts |

When a substrate printed with this ink is heated within the range of about 100°–175°C while simultaneously being irradiated with ultraviolet light, the ink dries in about 0.5 to 0.8 second.

EXAMPLE VI

A printing ink having the same composition as that of Example V, except the 10.0 parts of pentaerythritol tetraacrylate are replaced by 10.0 parts of trimethylol propane triacrylate, is prepared. When a substrate printed with this ink is heated at a temperature within the range of about 100°–175°C while simultaneously being irradiated with ultraviolet light, the ink dries in about 0.5 to 0.8 second.

EXAMPLE VII

A printing ink having the following composition is prepared:

| | | |
|---|---|---|
| rosin ester | 13.75 | parts |
| polyethylene | 10.00 | parts |
| long oil alkyd resin | 10.00 | parts |
| methyl eleostearates | 11.25 | parts |
| methyl ester of rosin acids | 10.00 | parts |
| wax | 5.00 | parts |
| barium peroxydiphosphate | 4.50 | parts |
| cobalt drier | 2.00 | parts |
| eugenol | 0.50 | part |
| Milori Blue pigment | 15.00 | parts |
| carbon black | 18.00 | parts |

When a substrate printed with this ink is heated at a temperature within the range of about 100°–175°C, the ink dries in less than 1 second.

While this invention has been illustrated by the presentation of specific embodiments thereof, it will be understood that the scope of the invention is limited only by the appended claims.

I claim:

1. In a fast drying, solvent-free printing ink containing 5–45 weight percent of pigment and a printing ink vehicle comprising a film-forming resin; the improvement comprising, as vehicle components, an ester of an aliphatic alcohol and a $C_{12}$ to $C_{20}$ unsaturated fatty acid and a metal salt of peroxydiphosphoric acid.

2. Printing ink of claim 1 wherein said vehicle comprises from 20 weight percent to 60 weight percent of an ester of an aliphatic alcohol and a $C_{12}$ to $C_{20}$ unsaturated fatty acid selected from the group consisting of methyl eleostearates, methyl linoleate, methyl linolenate, methyl esters of rosin acids, and mixtures thereof; from 10 weight percent to 35 weight percent of a film forming resin selected from the group consisting of rosin esters, polyethylene, aluminum octoate gel of rosin esters, long oil alkyd, and mixtures thereof; and from 3 weight percent to 6 weight percent of the barium salt of peroxydiphosphoric acid.

3. Printing ink of claim 2 containing 5–35 weight percent of a pigment selected from the group consisting of carbon black, phthalocyanine blue, Milori Blue, benzidine yellow, and mixtures thereof; said ink containing in addition from 10 weight percent to 30 weight percent of a polyunsaturated material selected from the group consisting of heat treated tung oil, boiled linseed oil, low pressure butadiene polymer, abietic acid esters, trimethylol propane triacrylate, pentaeyrthritol triacrylate, and pentaerythritol tetraacrylate; and from 2 weight percent to 6 weight percent of a photosensitizer selected from the group consisting of halogenated hydrocarbons, acyloins, alkyl titanates, benzophenones, triethanolamine, morpholine, and anthraquinone.

* * * * *